(12) United States Patent
Shlomot

(10) Patent No.: US 11,334,174 B2
(45) Date of Patent: May 17, 2022

(54) UNIVERSAL POINTING AND INTERACTING DEVICE

(71) Applicant: Eyal Shlomot, Long Beach, CA (US)

(72) Inventor: Eyal Shlomot, Long Beach, CA (US)

( * ) Notice: Subject to any disclaimer, the term of this patent is extended or adjusted under 35 U.S.C. 154(b) by 0 days.

(21) Appl. No.: 16/931,391

(22) Filed: Jul. 16, 2020

(65) Prior Publication Data

US 2021/0018991 A1 Jan. 21, 2021

Related U.S. Application Data

(60) Provisional application No. 62/875,525, filed on Jul. 18, 2019.

(51) Int. Cl.
*G06F 3/03* (2006.01)
*G06F 3/0346* (2013.01)
*G06F 3/038* (2013.01)

(52) U.S. Cl.
CPC .......... *G06F 3/0346* (2013.01); *G06F 3/0383* (2013.01)

(58) Field of Classification Search
CPC ................. G06F 3/0346; G06F 3/0383; G06F 2203/0383; G06F 3/017; G06F 3/011; G06F 3/03
See application file for complete search history.

(56) References Cited

U.S. PATENT DOCUMENTS

| | | | |
|---|---|---|---|
| 8,810,599 B1* | 8/2014 | Tseng | G05D 1/0246 345/633 |
| 9,720,510 B2* | 8/2017 | Di Censo | G06T 7/73 |
| 10,782,796 B2* | 9/2020 | Li | G06F 3/011 |
| 2012/0086631 A1* | 4/2012 | Osman | A63F 13/213 345/156 |
| 2012/0086725 A1* | 4/2012 | Joseph | G06F 3/0346 345/629 |
| 2012/0127110 A1* | 5/2012 | Amm | G06F 3/03545 345/174 |
| 2014/0152576 A1* | 6/2014 | Kim | G06F 3/0416 345/169 |

* cited by examiner

Primary Examiner — Lunyi Lao
Assistant Examiner — Jarurat Suteerawongsa

(57) ABSTRACT

Location services in handheld devices provide the user with information about objects of interest in the user's surroundings, which require identifying the location of the user and identifying the locations of objects of interest in the surroundings. This invention describes a novel approach in providing location services, by employing a universal pointing and interacting (UPI) device to identify objects of interest in the surroundings pointed at by the UPI device. Once an object of interest is identified, the UPI device may further be used to provide the user with information about the identified object, or to activate the identified object by the user of the UPI device.

13 Claims, 10 Drawing Sheets

A Schematic Diagram of an Operational Configuration for a UPI Device

A Schematic Diagram of Examples of Objects of Interest Pointed at by a UPI Device in Various Environments

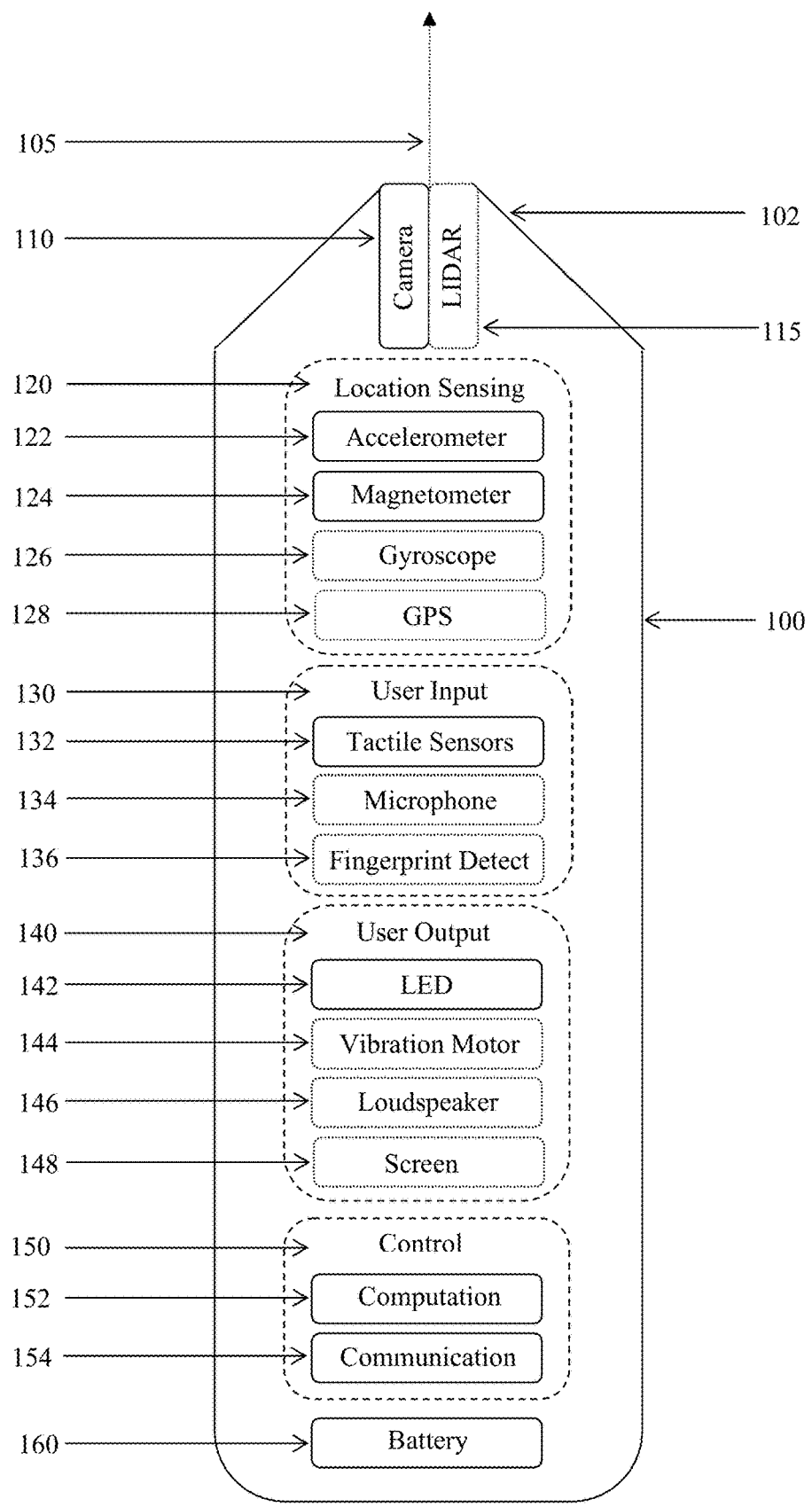
Figure 1 – A Schematic Diagram of Structure and Components Integrated in a UPI Device

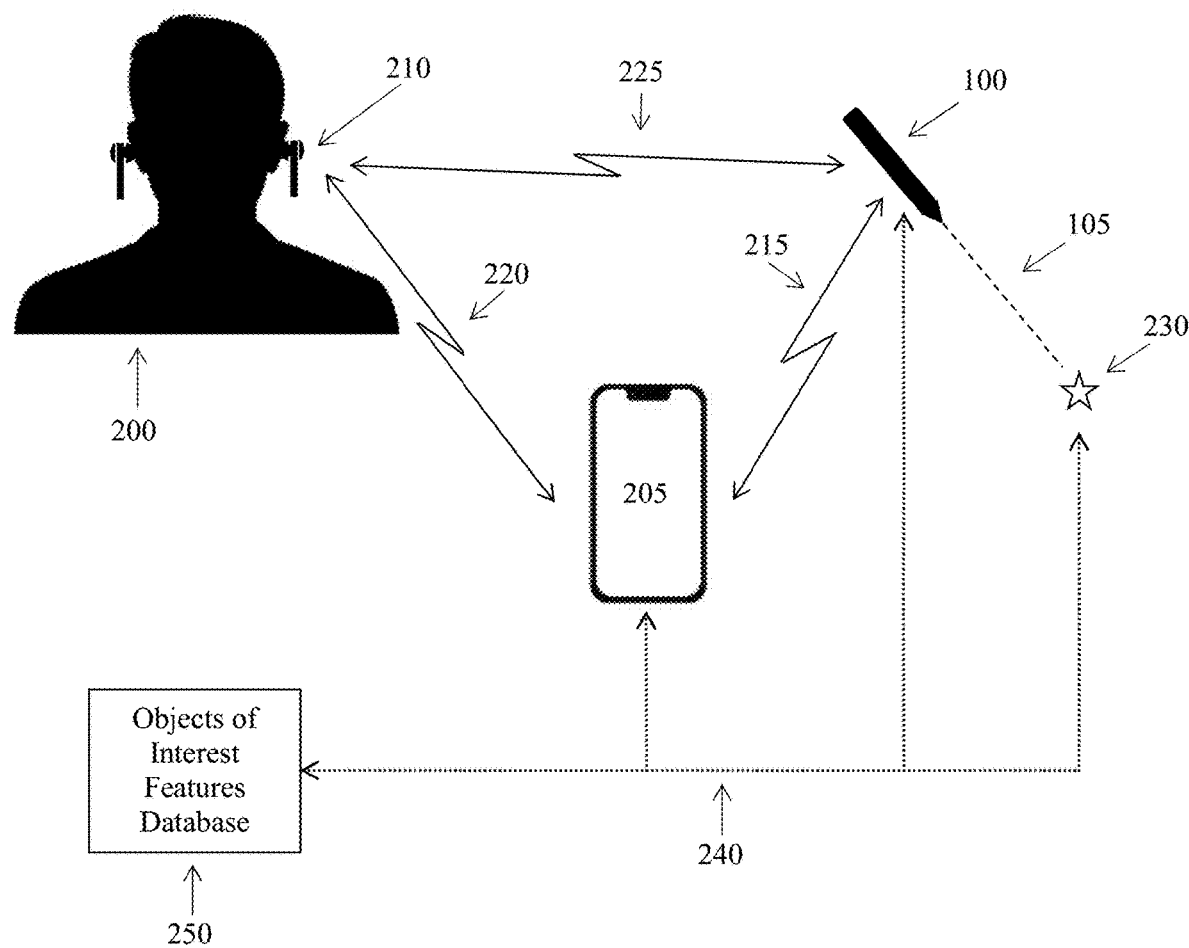
Figure 2 – A Schematic Diagram of an Operational Configuration for a UPI Device

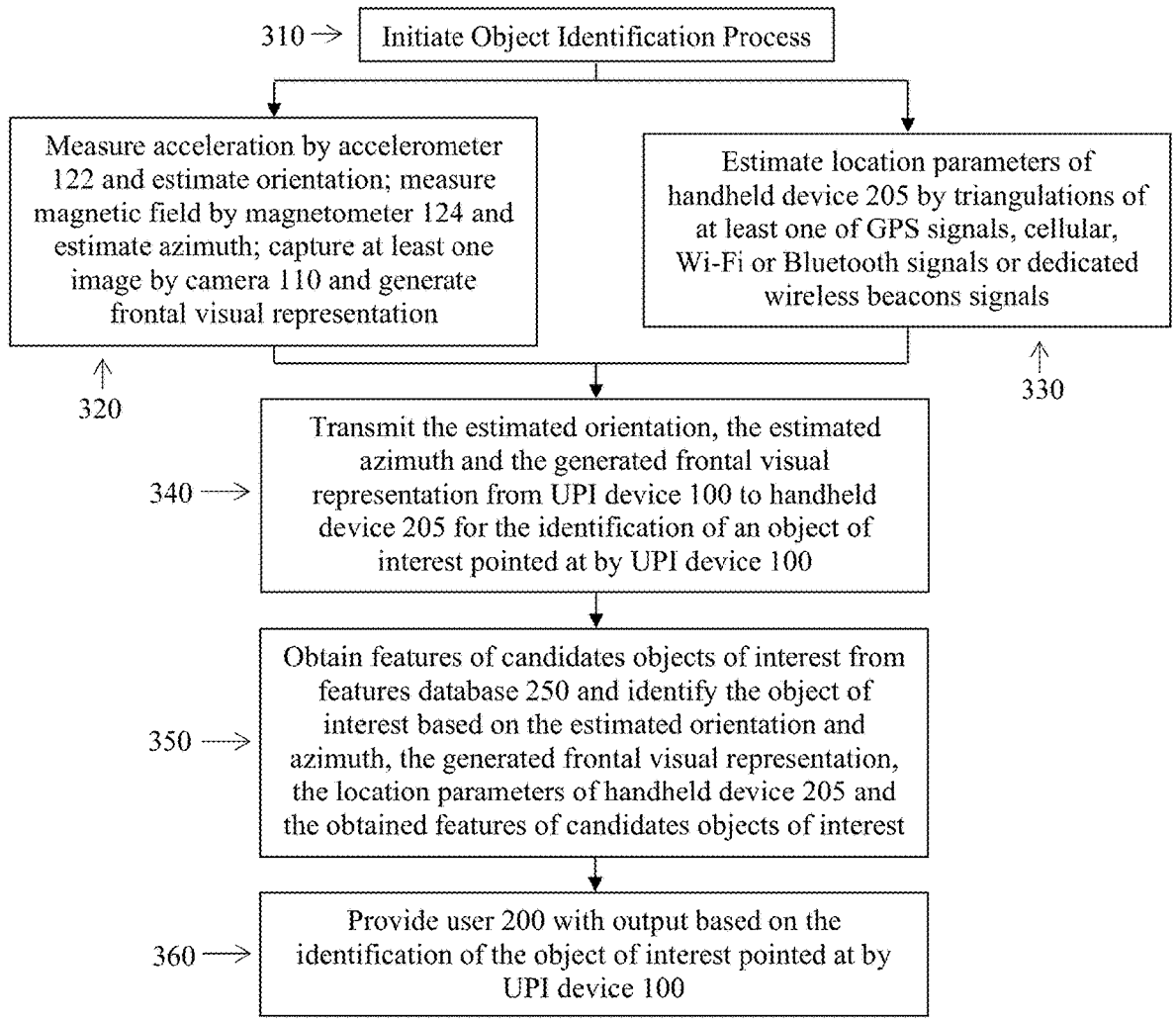
Figure 3 – A Schematic Diagram of the Operation of a UPI Device in Pointing, Identifying and Providing Information about Objects of Interest

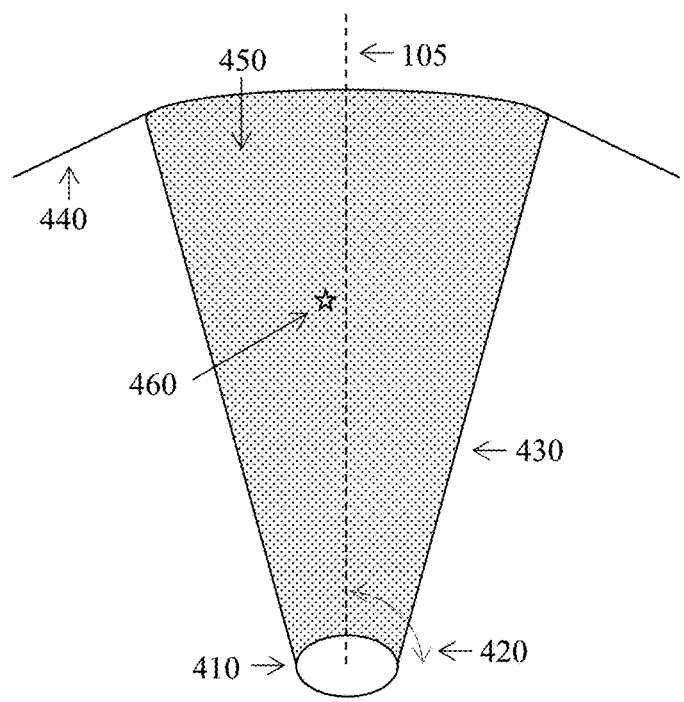
Figure 4A – A Schematic Diagram of a First Method of Identifying Objects of Interest Pointed at by a UPI Device
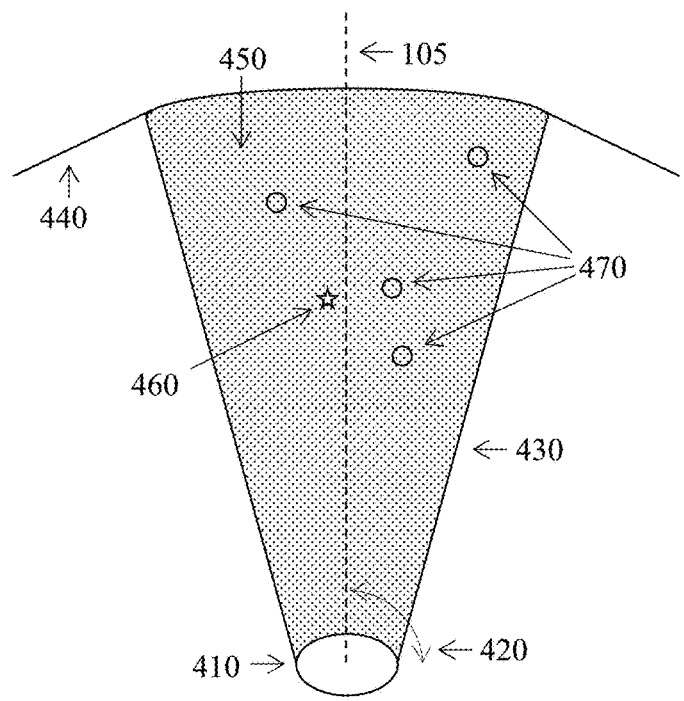
Figure 4B – A Schematic Diagram of a Second Method of Identifying Objects of Interest Pointed at by a UPI Device

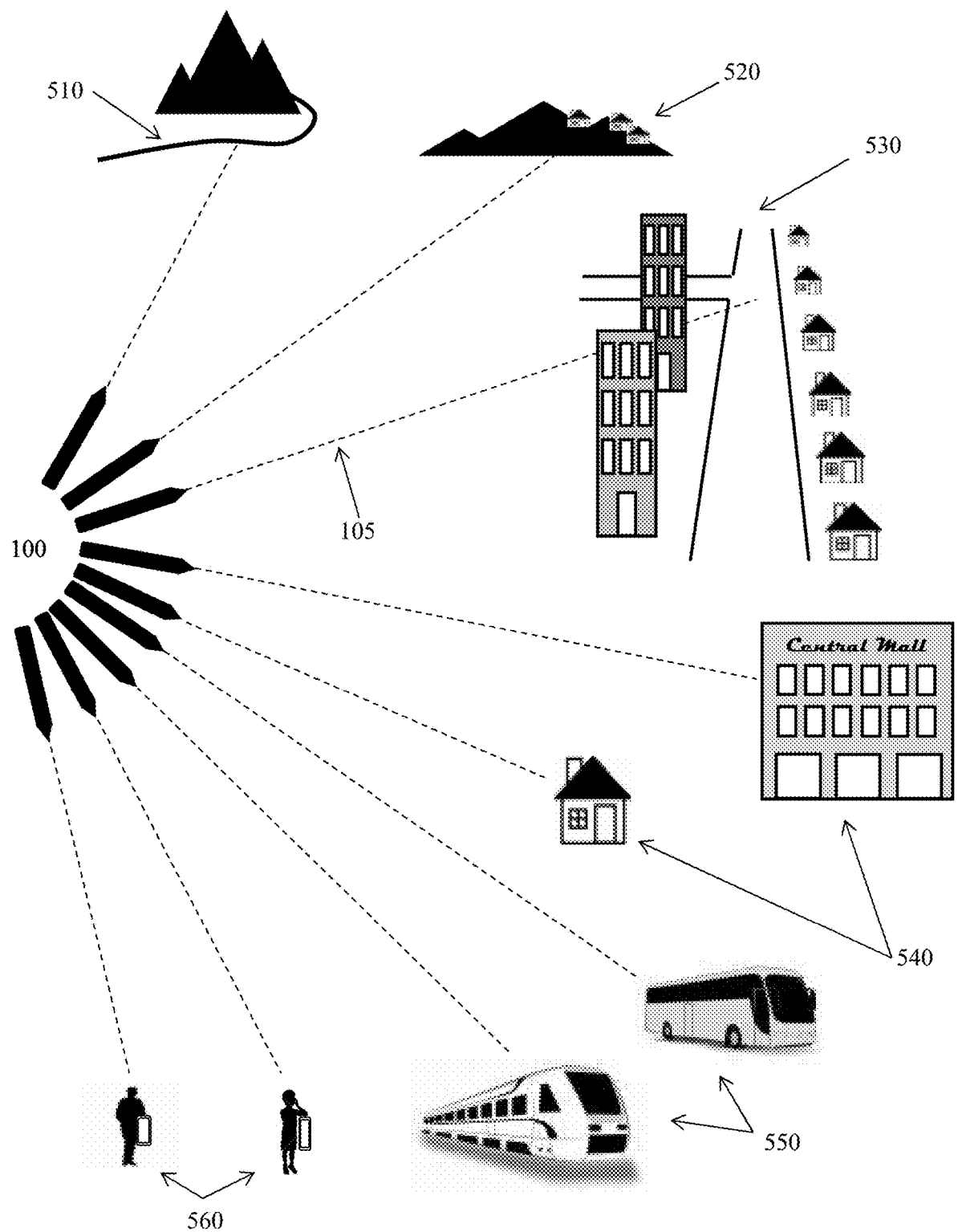
Figure 5 – A Schematic Diagram of Examples of Objects of Interest Pointed at by a UPI Device in Various Environments

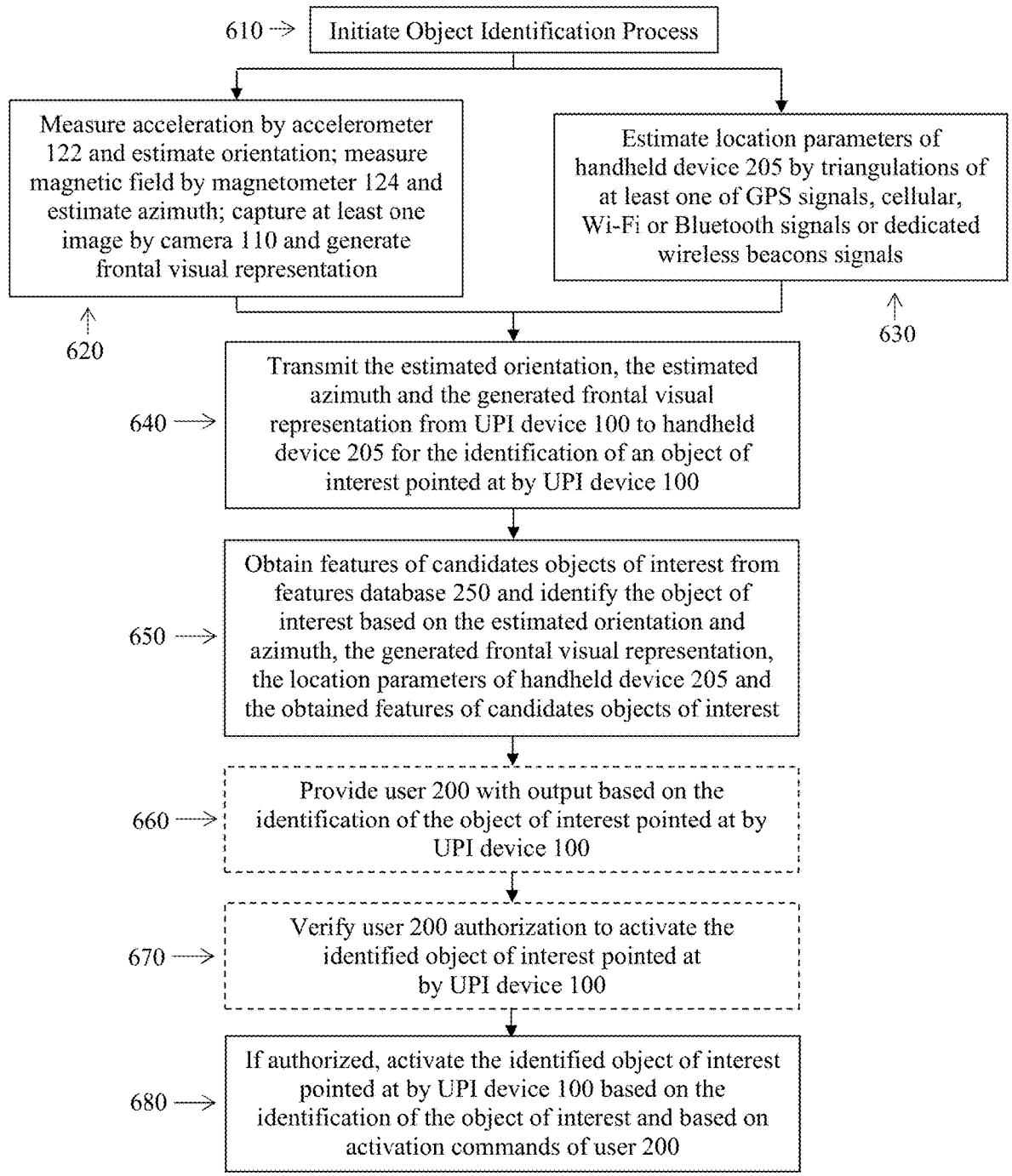
Figure 6 – A Schematic Diagram of the Operation of a UPI Device in Pointing, Identifying, Providing Information about Objects of Interest, Verifying User Authorization and Activating Objects of Interest

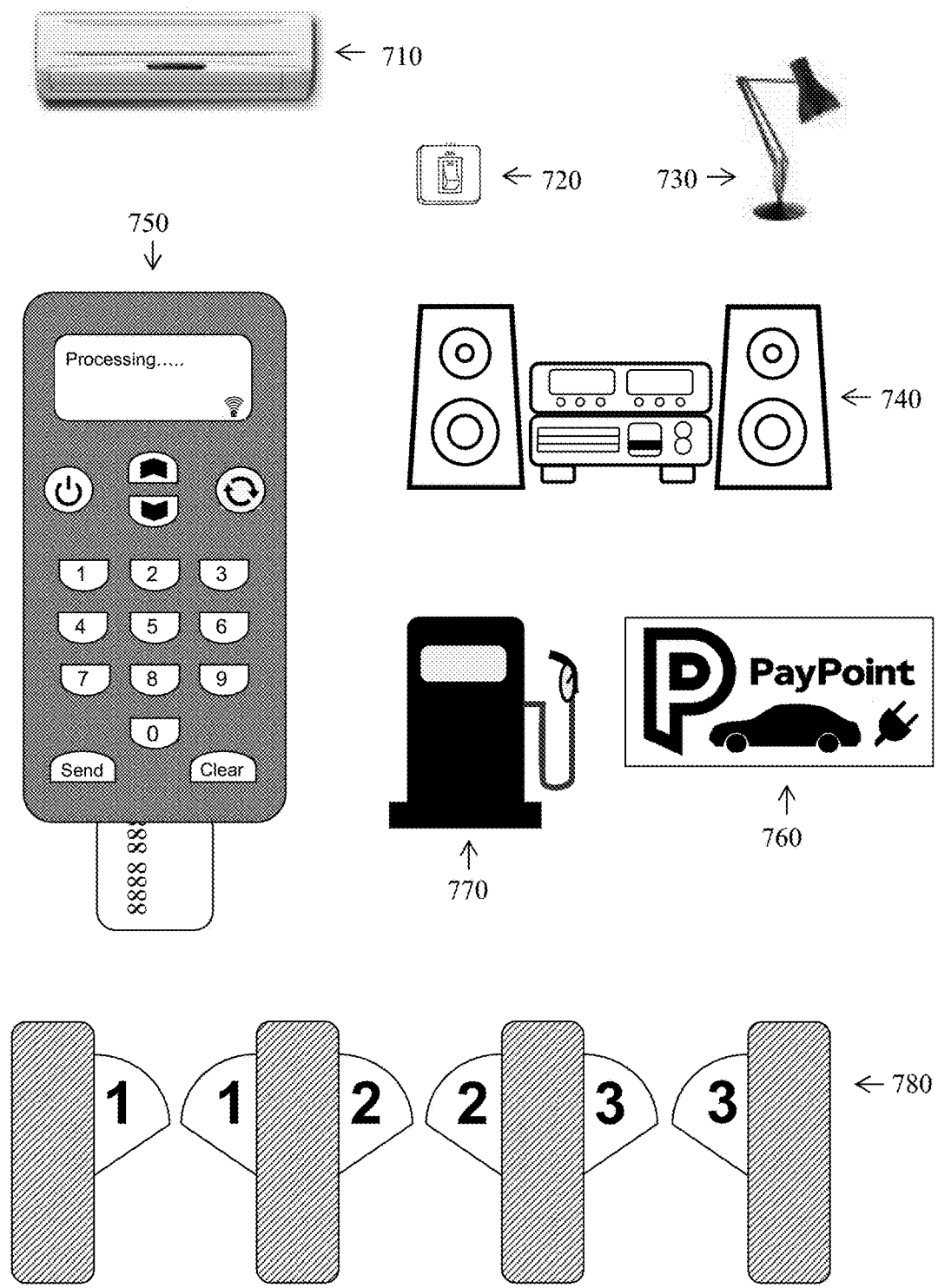
Figure 7 – A Schematic Diagram of Examples of Objects of Interest Pointed at and Activated by a UPI Device

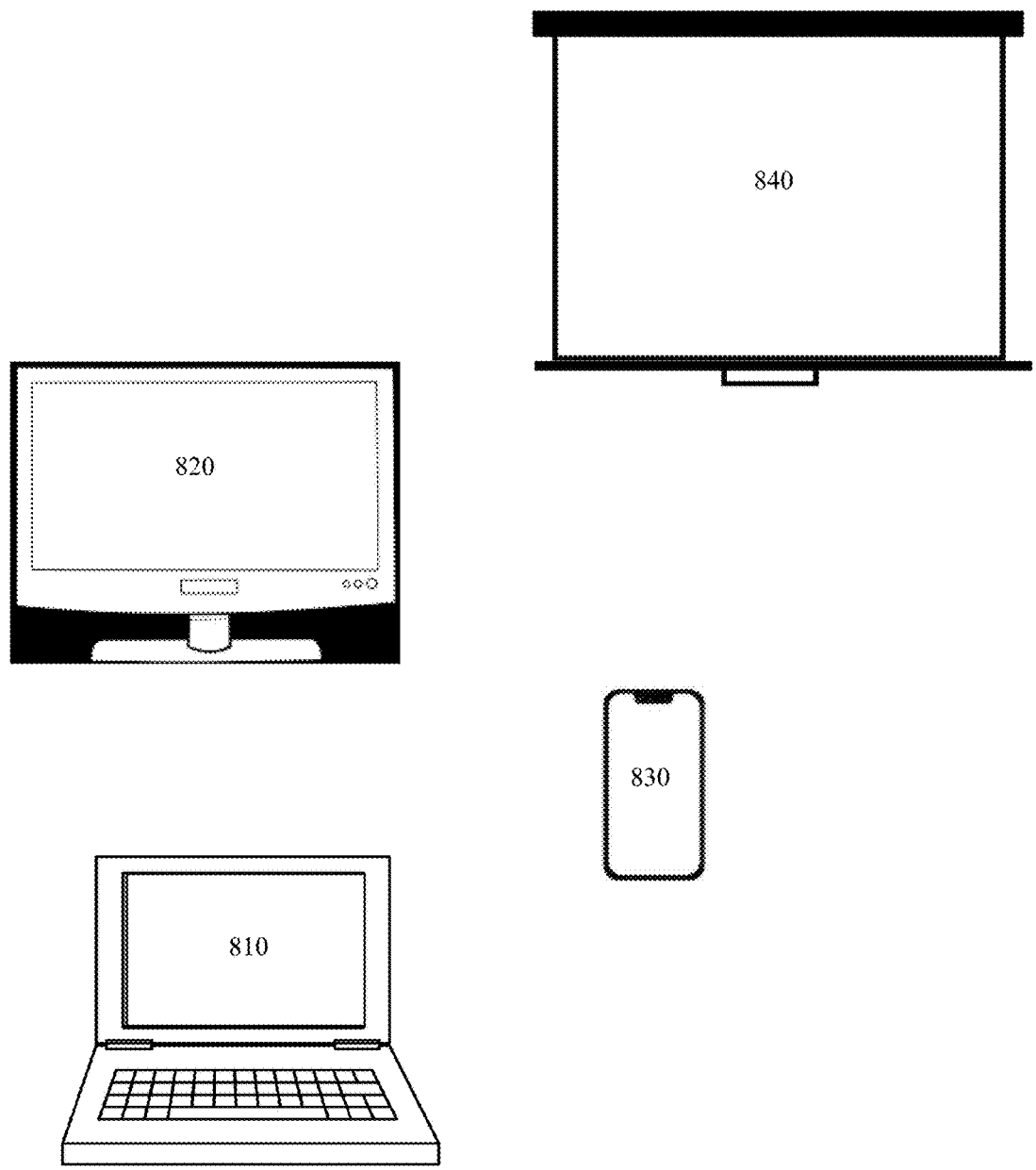
Figure 8 – A Schematic Diagram of Examples of Screens Pointed at and Activated by a UPI Device

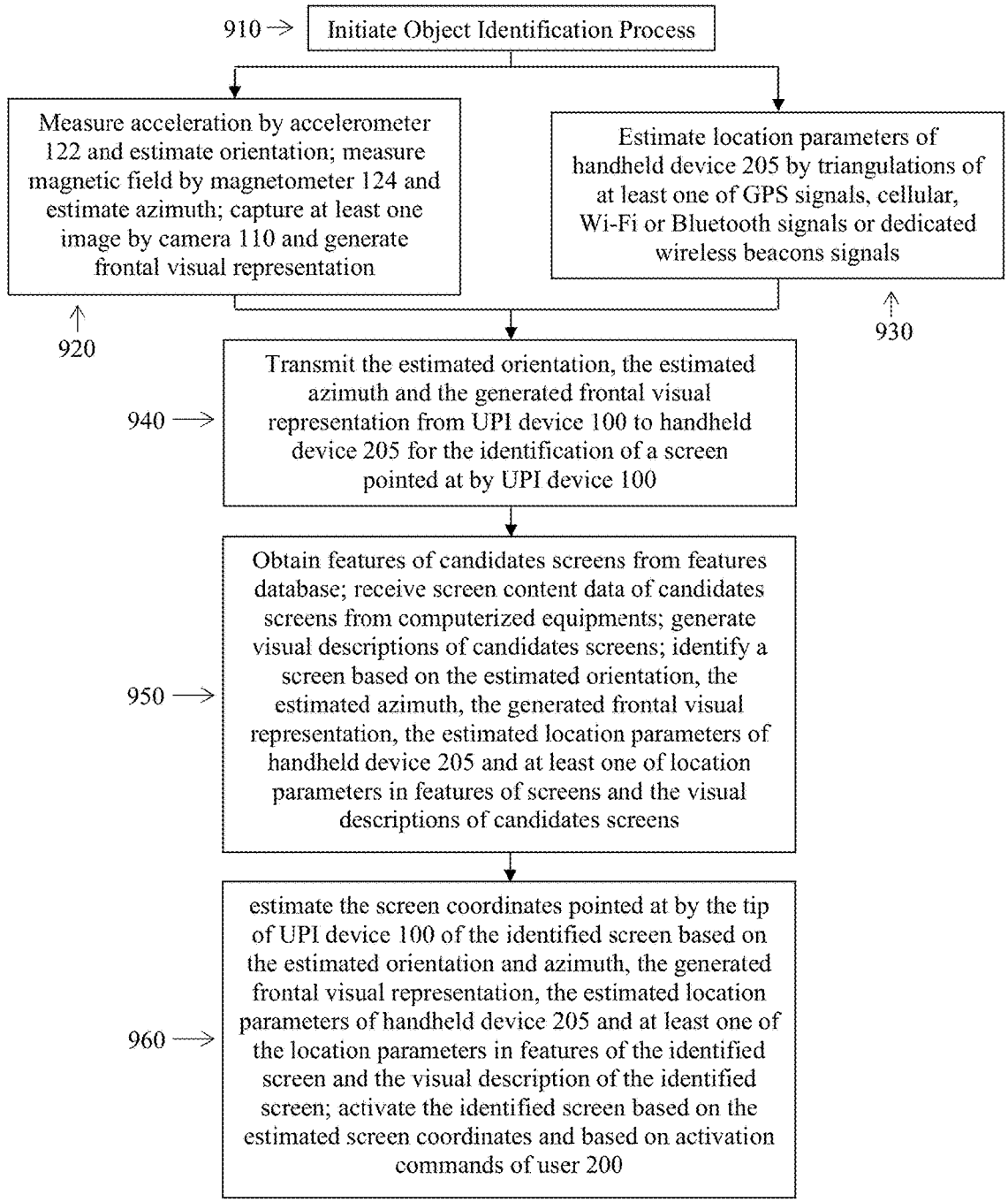
Figure 9 – A Schematic Diagram of the Operation of a UPI Device in Pointing and Activating Screens

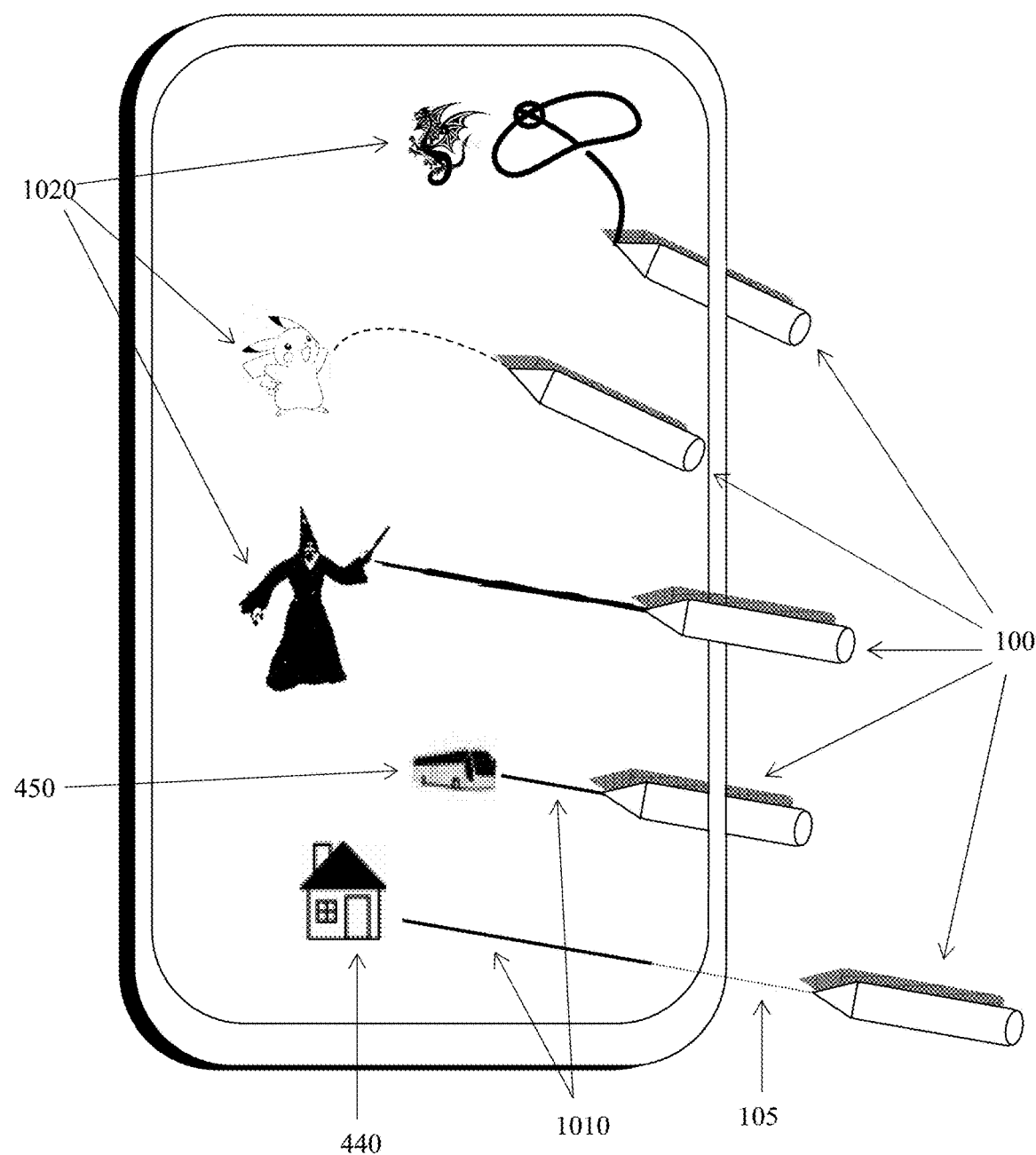
Figure 10 – A Schematic Diagram of Examples of Interaction by UPI Device with Real and Virtual Objects on a Screen of a Handheld Device

UNIVERSAL POINTING AND INTERACTING DEVICE

CROSS-REFERENCE TO RELATED APPLICATIONS

This application claims the priority benefits of U.S. Provisional Application No. 62/875,525 filed on Jul. 18, 2019, which is incorporated herein in its entirety by reference.

FIELD OF THE INVENTION

The present invention relates to systems that enable user interaction with objects in the user's surroundings. In particular the present invention describes a simple and practical universal pointing and interacting (UPI) device used to point at objects and to interact with the objects pointed at by the UPI device, such as providing information about the objects or activating such objects.

BACKGROUND ART

Advances in processing and sensing technologies enable users of electronic devices to receive information about and to interact with objects in their surroundings. Applications for navigation, ride-sharing, public-transportation, commerce or similar applications on handheld devices (e.g., smart-phones or tablets) make use of the location coordinates (longitude, latitude and altitude) of the users and are ubiquitous in everyday lives. Simplified augmented reality (AR) applications on handheld devices make use of the location parameters, such as the location coordinates, the azimuth and the orientation (pitch and roll) of the handheld devices to interact with the surroundings, such as Live View navigation that superimposes information tags on images of the surroundings captured by the camera of a handheld device, or star-gazing applications that allow the user to point and identify heavenly bodies and to receive information about such bodies via the camera and the screen of a handheld device. Full scale AR systems, civilian and military, commonly use the location parameters of head-mounted displays (HIVID) for user interaction with objects of interest in the surroundings, such as receiving information about or activating objects pointed at by the user's line-of-sight or by handheld control units. The core technology for the estimation of the location coordinates is satellite navigation, such as GPS, that estimates the longitude, latitude and altitude by triangulations of satellite signals (the acronym GPS is used throughout this disclosure to represent any global navigation system). The azimuth is estimated by a magnetometer that measures the earth magnetic field and the orientation (pitch and roll) is estimated by an accelerometer that measures the earth gravity vector. The accuracy of the estimation of the location parameters may improve in urban and indoor environments by triangulating wireless signals such as cellular, Wi-Fi, Bluetooth, or dedicated radio-beacons. Further accuracy in the estimation of the location parameters may be achieved by analyzing images of the surroundings taken by the camera of a handheld device for the detection of objects of interest with known pictorial representations and known locations. Once such objects of interest are detected, their known locations and the positions they appear in the camera field-of-view may be used for very accurate triangulations to establish the location parameters of the handheld device. This approach became feasible in recent years as visual descriptions and location parameters data of vast numbers of topographical, urban and commercial objects of interest are now available in accessible databases, as the result of extensive photographic and geographic surveys that were carried out at all corners of the world during the last decade.

The following US patents and patent applications disclose several background art aspects that are relevant to this invention, such as approaches of location parameters estimation, motion detection, styluses and wands, pointing and activating devices and AR systems, image assisted orientation and navigation, as wells as other aspects. U.S. Pat. Nos. 6,897,854, 7,596,767, 8,179,563, 8,239,130, 8,467,674, 8,577,604, 8,681,178, 8,698,843, 8,810,599, 8,878,775, 9,140,555, 9,195,872, 9,201,568, 9,224,064, 9,229,540, 9,280,272, 9,303,999, 9,329,703, 9,400,570, 9,429,434, 9,519,361, 9,639,178, 9,678,102, 9,696,428, 9,870,119, 10,028,089, 10,168,173, 10,198,649, 10,198,874, 10,240,932, 10,274,346, 10,275,047, 10,275,051, 10,281,994, 10,318,034, 10,324,601, 10,328,342, 10,365,732, 10,444,834, 10,488,950, 10,521,028, 10,565,724, 10,5920,10, and US patent applications 2018/0173397, 2019/0369754, 2020/0103963.

Immersive AR systems that use HMD may be able to provide a full AR experience, including the interaction with real and virtual objects in the environment, but are expensive, difficult to operate and were not yet shown to attract significant commercial attention. Simplified AR applications on handheld devices may have wider commercial penetration, but are quite uncomfortable and awkward to operate, as pointing at objects of interest is not intuitive and as the screen of a handheld device is used for both viewing the surroundings and entering user commands to interact with objects of interest in the surroundings. Moreover, simplified AR navigation applications on handheld devices can pose a danger to the user who holds the handheld device at eye level, causing significant distraction from the immediate surroundings. Therefore, there is a need for a cheap and simple device that can provide comfortable and intuitive pointing and interacting capabilities with objects of interest in the user's surroundings.

BRIEF DESCRIPTION OF THE INVENTION

The present invention is directed to a universal pointing and interacting (UPI) device that is configured to interact with objects of interest, where interacting means identifying objects of interest pointed at by the UPI device and at least one of providing information about such objects and activating such objects by the user of the UPI device. Objects of interest are geographical, topographical, urban, commercial and other types of objects in the surroundings that their features are readily tabulated in vast and accessible features databases. The features of the objects of interest are at least the location parameters of the objects of interest, but for most objects of interest the features may include visual descriptions of the objects of interest, such as the objects of interest pictorial representation or structural data. The features of the objects of interest may also include any additional useful information about such objects. The term "features database" is used throughout this disclosure to denote any publicly or privately available database that may be used to retrieve theses features of the objects of interest. Objects of interest may also be moving objects, such as public transportation vehicles, that estimate their location coordinates and that make their location coordinates available over the Internet or other networks. Objects of interest may also by virtual objects that are generated with known locations in the surroundings of the user of the UPI device.

A particular type of objects of interest are display screens, where the UPI device may be used to control such screens, similar to a mouse, remote control or stylus.

The UPI device comprises of a body with an elongated shape and dimensions suitable to be held by one hand, such as a wand or a stylus, which allows the user to point the tip of the elongated body toward objects of interest in the user's surroundings. The UPI device further comprises several electronic components that enable, together with the user's handheld device, the identification of an object of interest that is pointed at. The identification is based on data acquired by the UPI device, on data acquired by the user's handheld device, on data obtained from the features database and possibly on data that is received from the object of interest. Once identified, the object of interest may be interacted with, such as providing output to the user based on information about the identified object of interest or receiving input from the user to activate the identified object of interest. The output and the input may be provided by and received on the UPI device, the user's handheld device or auxiliary equipment such as headphones or earbuds.

Although the invention is described with respect to specific embodiments, the principles of the invention can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 is a schematic diagram of structure and components integrated in a UPI device.

FIG. 2 is a schematic diagram of an operational configuration for a UPI device.

FIG. 3 is a schematic diagram of the operation of a UPI device in pointing, identifying and providing information about objects of interest.

FIGS. 4A and 4B are schematic diagrams of methods of identifying objects of interest pointed at by a UPI device.

FIG. 5 is a schematic diagram of examples of objects of interest pointed at by a UPI device in various environments.

FIG. 6 is a schematic diagram of the operation of a UPI device in pointing, identifying, providing information about objects of interest, verifying user authorization and activating objects of interest.

FIG. 7 is a schematic diagram of examples of objects of interest pointed at and activated by a UPI device FIG. 8 is a schematic diagram of examples of screens pointed at and activated by a UPI device.

FIG. 9 is a schematic diagram of the operation of a UPI device in pointing and activating screens.

FIG. 10 is a schematic diagram of examples of interaction by a UPI device with real and virtual objects on a screen of a handheld device.

DETAILED DESCRIPTION OF THE INVENTION

State of the art processing and sensing technologies enable users of electronic equipments to receive information about and to interact with objects of interest in their surroundings. Handheld devices with simplified AR applications and full AR systems are examples of such equipments, while this invention describes a cheap and simple device that provides comfortable and intuitive pointing and interacting capabilities with objects of interest in the user's surroundings.

FIG. 1 demonstrates the shape of universal pointing and interacting (UPI) device 100 and shows a schematic diagram of the components integrated in UPI device 100. UPI device 100 comprises of an elongated body with dimensions suitable to be held by one hand, such as a wand or a stylus. Tip 102 of UPI device 100 is a frontal end of the longest dimension of the elongated body of UPI device 100 and the main axis of UPI device 100 is the axis of longest dimension of the elongated body of UPI device 100. Pointing ray 105 is an indefinite extension of the main axis in the frontal direction from tip 102 of UPI device 100.

Some components of UPI device 100 may be considered essential, indicated by full-line frames in FIG. 1, while other components may be considered optional, indicated by dashed-line frames in FIG. 1. Essential camera 110 (e.g., CameraCubeChip™ OVM7692), which is configured to capture at least one image from tip 102 of UPI device 100 in the frontal direction of the main axis of UPI device 100, and optional LIDAR 115, which is configured to measure distances from tip 102 of UPI device 100 in the frontal direction of the main axis of UPI device 100, are positioned at tip 102 of UPI device 100. UPI device 100 includes location sensing components 120, user input components 130, user output components 140, control components 150, and battery 160. Location sensing components 120 includes essential accelerometer 122 configured to measure acceleration parameters, essential magnetometer 124 configured to measure magnetic field parameters and optional gyroscope 126 configured to measure angular velocity parameters (typically all these 3 components are integrated in a single chip, commonly called 9DoF chip, e.g., InvenSense Inc. MPU-9250), as well as optional GPS 128 configured to measure the location coordinates of longitude, latitude and altitude of UPI device 100. User input components 130 includes essential tactile sensors 132 (e.g., switches, slides, dials or touch sensors), optional microphone 134 and optional fingerprint detection sensor 136. User output components 140 includes essential light emitting diode (LED) 142, as well as optional vibration motor 144, loudspeaker 146 and screen 148 (e.g., small alphanumeric screen or touch-screen). Control components 150 includes essential computation component 152, configured to process data and in particular configured to process the measured acceleration parameters to estimate the orientation of UPI device 100, to process the measured magnetic field parameters to estimate the azimuth of UPI device 100 and to process the at least one image captured by camera 110 to generate a frontal visual representation for UPI device 100. Control components 150 also includes essential communication component 154 configured to transmit and receive data from and to UPI device 100, and in particular is configured to transmit the estimated orientation, the estimated azimuth and the generated frontal visual representation to a handheld device. (Control components 150 is typically integrated on a single chip, e.g., Nordic nRF5283). The distinctions as "essential" and "optional" are only for the purpose of illustrating one simple and cheap embodiment of UPI device 100. For example, screen 148 may completely replace LED 142 in provided output to the user of UPI device 100. In yet another example, UPI device 100 may include GPS 128 and computation component 152 and communication component 154 may be configured to process and transmit the measured location coordinates of UPI device 100.

FIG. 2 shows an optional operational configuration for UPI device 100 that points at object of interest 230, where user 200 of UPI device 100 also uses handheld device 205 (e.g., smart-phone, tablet, etc.) and earbuds 210 that may include a microphone. Wireless connections 215, 220 and 225 may connect UPI device 100, handheld device 205 and earbuds 210, and are commonly Bluetooth connections, but Wi-Fi connections or any other wireless connection protocol may be used. Wireless connections 215, 220 and 225 enable the shared operation of UPI device 100, handheld device 205 and earbuds 210. One element of the shared operation is receiving inputs from user 200 by input elements on handheld device 205 or earbuds 210 (in addition to user input components 130 on UPI device 100) and providing outputs to user 200 by output elements on handheld device 205 or earbuds 210 (in addition to user output components 140 on UPI device 100). A second and critical element of the shared operation is the shared estimation of the location parameters and the shared processing between UPI device 100 and handheld device 205. More specifically, as handheld device 205 commonly incorporates GPS, cellular, Wi-Fi and Bluetooth components, the estimation of the location parameters of handheld device 205 (and therefore approximately of UPI device 100) may be obtained in handheld device 205 by triangulations of GPS signals, cellular signals, Wi-Fi signals, Bluetooth signals or dedicated radio-beacons signals. In addition, data acquired at UPI device 100 may be transmitted to be processed by handheld device 205, utilizing the superior computational and battery capacities of handheld device 205. The operational configuration diagram further shows communication link 240 and objects of interest features database 250. Communication link 240 may be any wireless or terrestrial communication link or a sequence of wireless or terrestrial communication links. Communication link 240 provides the means for UPI device 100 and handheld device 205 to connect with features database 250 and with object of interest 230. Clearly, other operational configurations for UPI device 100 are possible. For example, UPI device 100 may be equipped with GPS 128 for independent estimation of its location coordinates. Similarly, earbuds 210 with microphone are not essential and are depicted merely to demonstrate the possibility of utilizing common existing auxiliary equipment for audio input and output from/to user 200.

FIG. 3 is a schematic flowchart of a first operation method in pointing at objects of interest, identifying such objects and providing user 200 of UPI device 100 with information about such objects, based on the configuration described in FIG. 2. The identification process may be initiated at step 310 when UPI device 100 is relatively motionless, such as when at least one motion parameter, such as acceleration, time-differences of magnetic field or angular velocity is below a predetermined threshold, or when the differences between two or more images taken by camera 110 are sufficiently small. The identification process may also be initiated by tactile or audio commands from user 200, provided by at least one of user input components 130, handheld device 205 and earbuds 210. Step 320 describes the processing by UPI device 100 and Step 330 describes the processing by handheld device 205, as the processing is carried out by both devices. Step 320 describes measuring acceleration parameters of UPI device 100 by accelerometer 122, measuring magnetic field parameters of UPI device 100 by magnetometer 124 and capturing at least one image by camera 110 positioned at tip 102 of UPI device 100 facing the frontal direction of the main axis of UPI device 100. Computation component 152 is configured to process the measured acceleration parameters to estimate the orientation of UPI device 100, the measured magnetic field parameters to estimate the azimuth of UPI device 100 and the at least one image captured by camera 110 to generate a frontal visual representation for UPI device 100. The processing of the measured acceleration parameters and the measured magnetic field parameters may involve any averaging, filtering or other processing to obtain accurate estimations of the orientation and the azimuth. The frontal visual representation for UPI device 100 may be the at least one image captured by camera 110, but the processing of the at least one image captured by camera 110 to generate the frontal visual representation for UPI device 100 may also involve generating image differences, edge detection, clipping, brightness control, dimension and perspective conversions, compression and any other processing for generating a suitable frontal visual representation for UPI device 100. Other parameters may also be measured and processed by UPI device 100 at step 320, such as angular velocity parameters measured by gyroscope 126, distance parameters measured by LIDAR 115 or any other data that is needed for the operation of UPI device 100. The location parameters of handheld device 205 are estimated in step 330 by triangulations of at least one of GPS signals, cellular signals, Wi-Fi signals, Bluetooth signals and dedicated wireless beacons signals. The estimated location parameters of handheld device 205 for the configuration described in FIG. 2 are approximations of the location parameters of UPI device 100, as UPI device 100 and handheld device 205 are assumed to be at about arm-length distance. Moreover, the estimation of the location parameters in handheld device 205 is in particular efficient as hardware and software for satellites and wireless communication and for the triangulation algorithms are generally integrated in any handheld device.

As depicted in step 340, communication component 154, which is configured to transmit and to receive data to/from handheld device 205 over wireless connections 215, is configured to transmit to handheld device 205 the estimated orientation of UPI device 100, the estimated azimuth of UPI device 100 and the generated frontal visual representation for UPI device 100, for the identification of an object of interest pointed at by UPI device 100. Step 350 describes obtaining features of candidates objects of interest from features database 250 followed by the identification of an object of interest based on the estimated orientation of UPI device 100, on the estimated azimuth of UPI device 100, on the generated frontal visual representation for UPI device 100, on the estimated location parameters of handheld device 205 and on the features of candidates objects of interest obtained from features database 250, as depicted in FIG. 4 and described below.

If UPI device 100 includes GPS 128, the estimated location parameters of UPI device 100 may be used instead of the estimated location parameters of handheld device 205, which means that step 330 is executed by UPI device 100 to estimate the location parameters of UPI to device 100. If the identification process is performed by handheld device 205, step 340 further include the transmission by communication component 154 of the estimated location parameters of UPI device 100 to handheld device 205. If the identification process is performed by UPI device 100, step 340 is not required. Moreover, for obtaining of the features of candidates objects of interest from features database 250, one option is for handheld device 205 to obtain the features of candidates objects of interest from features database 250 and for communication component 154 to be configured to receive the obtained features of candidates objects of interest from handheld device 205, while another option is for communication component 154 to obtain the features of candidates objects of interest directly from features database 250. Obviously, the alternative processing and dataflow options described here also apply for the processing and dataflow depicted by FIGS. 6 and 9 and described further below.

As the pointed at object of interest is identified, one option is to provide output to user 200 by an output component of UPI device 100 configured to provide output based on the identity of the object of interest, wherein the output component is at least one of LED 142, vibration motor 144, loudspeaker 146 and screen 148, as outlined on step 360. For example, if a house with a particular address is identified, the output may be to turn LED 142 to a green color, to play "address found" voice prompt on loudspeaker 146 and to display the address of that house on screen 148. Another option is to provide output to user 200 based on the identity of the object of interest by the screen, audio components or vibrations of handheld device 205 or by earbuds 210. Similar to the previous example, if UPI device is pointed at a particular restaurant, an audio announcement may be played in earbuds 210 and the menu of that restaurant may be displayed on the screen of handheld device 205.

As user 200 points UPI device 100 to a particular direction, an object of interest that resides in that direction may be identified. The identification of an object of interest is the detection of which object of interest is pointed at by UPI device 100, based on the estimated orientation of UPI device 100, the estimated azimuth of UPI device 100, the generated frontal visual representation for UPI device 100, the location parameters of handheld device 205 and the features of objects of interest obtained from features database 250. FIG. 4A is a 2-dimensional schematic diagram of a possible identification scheme. For clearer visual representation, the diagram is 2-dimensional, considering only 2 location coordinates and the azimuth, but it can be easily extended with the additional location coordinate and the orientation parameter to depict a 3-dimensional configuration. The location coordinates uncertainty ellipse 410 represents the inaccuracy in the measurement of the location coordinates of tip 102 of UPI device 100, which defines the origin of pointing ray 105. This inaccuracy is partially due to the inherent inaccuracy in the estimation of the location coordinates of handheld device 205, but additional inaccuracy may occur as UPI device 100 might be at arm-length distance from handheld device 205. The direction of pointing ray 105 is defined by estimated azimuth 420 and uncertainty cone 430 represents the inaccuracy in the estimation of azimuth 420 by UPI device 100. This inaccuracy is partially due to the inherent inaccuracy and the expected interferences in the measurements of the earth magnetic field, but might also resulted from some instability of the hand of user 200 that holds UPI device 100. Interest perimeter 440 represents the perimeter within of objects of interest should be identified. Interest perimeter 440 may be set according to the environment where user 200 is, such as few hundred meters in urban environment but few kilometers in non-urban environment, it might vary in different directions, such as limiting interest perimeter 440 to objects of interest in a direct line-of-sight of user 200, or may also be set by user 200. Location coordinates uncertainty ellipse 410, uncertainty cone 430 of azimuth 420 (combined with the uncertainty in the estimation of the orientation in 3-dimension) and interest perimeter 440 establish sector of interest 450 (which is a volume in 3-dimensions) in the surroundings of user 200. Once sector/volume of interest 450 is established, candidates objects of interest are defined as the objects of interest with location coordinates that are within sector/volume of interest 450, wherein the location coordinates of the candidates objects of interest are part of the features of objects of interest that are obtained from features database 250, as the common procedure of finding information about objects of interest to display on the screen of a handheld device by a common navigation application. User 200 may further define possible types and locations of candidates objects of interest to limit or to extend the scope of candidates objects of interest. For example, user 200 may limit the type of objects of interest to be "ice-cream shops" while extending interest perimeter 440 to a 10 minutes walking distance. The obtaining of the features of candidates objects of interest from features database 450 is based on the established sector/volume of interest 450 and the establishing of sector/volume of interest 450 is based on the estimated azimuth of UPI device 100, on the estimated orientation of UPI device 100 and on the estimate location parameters of handheld device 205, therefore the obtaining of the features of candidates objects of interest from features database 250 is based on the estimated azimuth of UPI device 100, on the estimated orientation of UPI device 100 and on the estimated location parameters of handheld device 205. As a simplified example, FIG. 4A shows a single object of interest 460 that is found within sector of interest 450 and therefore object of interest 460 is the identified object. Such a simplified situation may happen, for example, if user 200 is at an outdoor environment and a mountain peak is the single object of interest within sector of interest 450, or when user 200 is in urban environment and points to a close-by house that is the only object of interest within sector of interest 450.

While it is possible that only one object of interest 460 is within sector of interest 450, FIG. 4B, which has similar elements to FIG. 4A, demonstrates a more realistic situation where other candidates objects of interest 470 are found to be within sector of interest 450 in addition to object of interest 460, which means additional refinement methods are needed to complete the identification process. One method is to estimate the direction and the distance of UPI device 100 from handheld device 205 using measurements of the direction and strength of wireless connection 215 (e.g., a Bluetooth connection), which may help to reduce the size of uncertainty ellipse 410 for a narrower sector of interest 450. Two other methods make use of the frontal visual representation for UPI device 100 in performing more complex yet more precise identification processes. Both methods are based on the particular position of camera 110 facing the frontal direction at tip 102 of UPI device 100 with perfect alignment of the field of view of camera 110 with the main axis of UPI device 100. As camera 110 captures an image, that image contains the captured shapes of several or all candidates objects of interest in sector of interest 450. The alignment of camera 110 with the main axis of UPI device 100 means that the displacements of the captured shapes of the candidates objects of interest from the center of the frontal visual representation for UPI device 100 are directly related to the distances of the actual objects of interest from the path of pointing ray 105 in the surroundings. In the first method of these two methods, the central section of the frontal visual representation for UPI device 100 is matched with the visual descriptions of candidates objects of interest obtained from features database 250. If a match is found, it means that a shape of a particular object (e.g., object of interest 460) was captured in that central section and therefore that particular object is identified as the object of interest that is pointed at by UPI device 100 (rather than the other objects of interest 470). It is still possible, however, that the pointed at object of interest 460 does not have a visual description in the features of candidates objects of interest (e.g., if the object of interest is a person carrying a handheld device). It is also possible that the pointed at object of interest 460 is viewed by camera 110 from the side or the back of the direction the visual description of this object was captured and stored in features database 250. Therefore, in the second method of these two methods, the visual descriptions of some or all candidates objects of interest are matched to the whole, not only the central section, of the frontal visual representation for UPI device 100, such that several matches are found. Once several shapes of candidates objects of interest are matched and found, triangulations may be used for very precise estimation of the location coordinates, azimuth and orientation of UPI device 100, based on the known locations of the several objects of interest with found matched shapes and the relative positions of the matched shapes of these objects of interest in the frontal visual representation for UPI device 100. For example, in urban environment the frontal visual representation for UPI device 100 may contain, in addition to the shape of an object of interest pointed at by UPI device 100, also the shapes of several other street objects of interest such as lamp posts, traffic signs, commercial signs, street curbs, building façades or any other street objects. Visual descriptions of such street objects may be available in photographic surveys of that particular urban environment and the locations of these street objects may be tabulated very precisely in city planning databases, resulting in very accurate triangulation estimations of the location coordinates, azimuth and orientation of UPI device 100. Once these location parameters are accurately estimated, the sizes of uncertainty ellipse 410 and uncertainty cone 430 may be significantly reduced, leading to a significantly narrower sector of interest 450, such that object of interest 460 may be unambiguously identified, even if its image is not available in features database 250 or if its image taken by camera 110 does not match its visual description in features database 250. In addition, distance measurements by LIDAR 115 may be used in the identification process, for example, by confirming that the distance to the identified object of interest matches the expected distance to that object, where the expected distance to any object of interest may be determined from the estimated location coordinates of UPI device 100 and the location coordinates of that object of interest obtained from parameters database 250.

The visual descriptions of candidates objects of interest in features database 250 may have been captured during the photographical surveys from different distances, different directions and different lighting conditions than the capturing of candidates objects of interest in the frontal visual representation for UPI device 100. Therefore, the identification of objects of interest is performed by correlating ("matched filtering") and finding matches between a processed version of the frontal visual representation for UPI device 100 with processed versions of the visual descriptions of candidates objects of interest. The term "processed version" is used here to denote versions that are generated by processing to equalize and compensate for such different image capturing conditions. For that processing, assume that the obtained features of candidates objects of interest comprise of the location parameters of candidates objects of interest and the visual descriptions of candidates objects of interest, and optionally also the lighting conditions for the capturing of the visual descriptions of candidates objects of interest during the photographical surveys. The estimated orientation and azimuth of UPI device 100 and the estimated location parameters of handheld device 205 provide initial approximations of the location coordinates of camera 110 and the direction of pointing ray 105. These initial approximations may be used, together with the location parameters of candidates objects of interest, in scaling, rotating, adjusting the aspect ratio, modifying the perspective representations and other processing to generate processed versions of the visual descriptions of candidates objects of interest or of the frontal visual representation for UPI device 100, wherein these equalizations and compensations result in processed versions that are best suitable for performing the matching and the identification. The initial approximations of the location coordinates of camera 110 and the direction of pointing ray 105 may also be used to estimated the lighting conditions for the at least one image captured by camera 110 (e.g., the angle from the sun), where these estimated lighting conditions, together with the lighting conditions for the visual descriptions of candidates objects of interest may be used for further processing in adjusting and equalization of at least one of the frontal visual representation for UPI device 100 and the visual descriptions of candidates objects of interest. Therefore, an optional preceding step to the matched filtering in identifying the object of interest is processing at least one of the visual descriptions of candidate objects of interest and the frontal visual representation for UPI device 100 to generate at least one of a processed version of the visual descriptions of candidates objects of interest and a processed version of the frontal visual representation for UPI device 100, wherein the processing is based on the estimated orientation of UPI device 100, on the estimated azimuth of UPI device 100, on the estimated location parameters of handheld device 205 and on the obtained location parameters of candidates objects of interest, and wherein the identifying of the object of interest is further based on at least one of the processed version of the visual descriptions of candidate objects of interest and the processed version of the frontal visual representation for UPI device 100.

FIG. 5 provides several examples of pointing and identifying of different objects of interest and providing user 200 with outputs based on the identification. As user 200 of UPI device 100 points toward distant road 510, green LED may be set on UPI device 100 followed by a voice prompt on earbuds 210 listing the two cities that distant road 510 connects. Pointing toward village 520, the name of the village and food services in that village may be displayed on the screen of handheld device 205. UPI device 100 may be particularly useful in urban environment 530, where countless urban landmarks such as streets, residences and businesses may be pointed at and where rich information about such landmarks may be provided to user 200. UPI device 100 may also be used by user 200 to navigate in urban environment 530 with simple outputs such as LED blinking or vibration as UPI device 100 points to the desired route.

For private house and mall in urban environment 540, UPI device 100 may be used to identify details such as specific entrances into buildings, utility hookups, fire hydrants, fire exits or other useful commercial or safety objects of interest. As GPS systems are installed on practically all modern buses, trams, trains and taxis, the locations of most public transportation vehicles 550 are known and are available on the Internet or other networks. Pointing UPI device 100 to such public transportation vehicles 550 may be used to identify the particular transportation vehicle and to provide user 200 with route and fare information. As a final example, the location of any person carrying a handheld device may be known (with the consent of that person) and pointing UPI device 100 toward person carrying handheld device 560 may provide user 200 with the general direction of such person, which might help to locate a child lost in a busy stadium or to find a friend in a crowded mall, city street or even at the great outdoors.

FIG. 6 is a schematic flowchart of a second operation method of UPI device 100 in pointing at objects of interest, identifying an object of interest, optionally providing user 200 with information about the identified object of interest, optionally verifying the authorization of user 200 to activate the identified object of interest and, if authorized, activating the identified object of interest based on the identification of the object and based on activation commands of user 200. This second operation method is merely a variant of the first operating method described in FIG. 3, where the key difference is that the identified objects of interest are capable of being activated by user 200 of UPI device 100. Steps 610-650 are identical to steps 310-350 and the description of these steps for FIG. 6 is identical to the description of the corresponding steps in FIG. 3. Step 660 is identical to step 360, but is optional as providing user 200 with output about the identified object of interest is not mandatory for this second operation mode, as some objects of interest (e.g., air-condition or light fixture) may not require providing output to user 200. As activation of some objects of interest may need to be restricted to authorized users (e.g., locked doors, payment stations), optional verification of authorization for user 200 to activate the identified object of interest is described in step 670. The authorization verification may use fingerprint detection sensor 136, but any other verification approach may be used, such as authentication of voice signature received by microphone 134 (or any microphone on handheld device 205 or on earbuds 210) or authentication of a predetermined motion pattern as UPI device 100 is manipulated by user 200, measured by at least one of accelerometer 122, magnetometer 124, camera 110 and gyroscope 126. To activate the identified object of interest by user 200, activating signals are produced by at least one component of UPI device 100 configured to produce the activating signals to activate the identified object of interest, wherein the at least one component is at least one of accelerometer 122, magnetometer 124, camera 110, gyroscope 126, tactile sensors 132, microphone 134 and fingerprint detection sensor 136, as depicted in step 680. A first possibility is for computation component 152 to be configured to process the produced activating signals to generate activation commands and for communication component 154 to be configured to transmit the generated activation commands via communication link 240 to the identified object of interest to activate the object of interest. A second possibility is for communication component 154 to be configured to transmit the produced activating signals via wireless connection 215 to handheld device 205, wherein handheld device 205 is configured to process the activating signals to generate activation commands and handheld device 205 is further configured to transmit the generated activation commands to the identified object of interest via communication link 240. A third possibility is for computation component 152 to be configured to process the produced activating signals to generate intermediate activating signals and for communication component 154 to be configured to transmit the generated intermediate activating signals to handheld device 205, wherein the intermediate activating signals are further processed by handheld device 205 to generate activation commands for the identified object of interest that are transmitted from handheld device 205 to the identified object of interest. For example, to activate a door lock, user 200 may make a circular clockwise motion pattern with tip 102 of UPI device 100, which may be detected as motion signals by any of accelerometer 122, magnetometer 124, camera 110 and gyroscope 126, the motion signals may then be analyzed by computation component 152 to generate the "lock open" activation command. Alternatively, if the door lock requires authorization, user 200 may press a finger on fingerprint detection sensor 136, the fingerprint detecting signals are then processed by computation component 152 to generate processed fingerprint detecting signals that are transmitted to handheld device 205 and are further processed by handheld device 205 for authorization to generate the "open lock" activation command. Obviously, for this last example, the authorization process and the activation process are combined.

FIG. 7 provides several examples of pointing at, identifying and activating objects of interest by UPI device 100. Objects of interest in a residential (or office) environments such as air-condition 710, light switch 720, light fixture 730 and audio system 740 are of particular interest, as the location parameters and visual descriptions of such objects of interest are likely not stored in a public features database. However, assuming that prior access is possible to the environment where air-condition 710, light switch 720, light fixture 730 and audio system 740 are located, the location parameters and visual descriptions of such objects of interest may be determined and stored in a private features database, which may be used in the identification process as discussed above for publicly accessible features database 250. Point of sale 750, car battery charging system 760, gas pump 770 and entrance gates 780 (to train platforms, stadium, etc.) are examples of another type of objects of interest that may be pointed at, identified and activated by UPI device 100. Such objects of interest are commonly activated by a card, PIN, QR code or a payment application on a handheld device. The activation of such objects of interest is a business transaction of payments for goods, electricity, gas, entrance fees or similar payments. The location parameters and visual descriptions of such objects of interest may be available on commercial accessible features database 250. Moreover, as some of these objects of interest may include wireless communication elements, the identification of these objects of interest might further use wirelessly received information from these objects of interest and measurements of the direction and strength of the wireless signals may assist in the identification process. Once such object of interest is identified, information about the identified object and the required payment or credit may be provided to user 200 via screen 148, the screen of handheld device 205 or audio prompts via any audio output component on UPI device 100, handheld device 205 or earbuds 210. To complete the payment or the credit, authorization of user 200 may be verified, for example, by a finger print, a voice signature, face recognition or any other method. Once user 200 is authorized to perform the payment or the credit, the identified object of interest is activated, such as completing the transaction by point of sale 750, switching on car battery charging system 760 or starting gas pump 770. For entrance gates 780, in addition to completing the financial transaction, a particular gate to be opened for user 200 may be identified by a particular marking on each gate (e.g., numerals), which is captured by camera 110.

FIG. 8 provides examples of display screens that are used for interaction with computerized equipments, such as computer screen 810, TV screen 820, touchscreen in handheld device 830 (which might be the same as handheld device 205 or a different handheld device) or presentation screen 840 in a classroom or a lecture hall. Such screens are used to display information that is generated by the computerized equipments to the users, but are also used as tools for entering user input with common pointing elements such as mouse, remote control, fingers or stylus. UPI device 100 may be used for pointing at such screens, identifying a pointed at screen and activating the identified screen, in a method that is particular to screens, but is comparable to the method of pointing, identifying and activating objects of interest presented in FIGS. 3 and 6 and discussed above. A first difference is that each screen renders visual information generated by the computerized equipments, which means that as UPI device 100 points at a screen, the at least one image captured by camera 110 contains not only the outline of that screen, but also the visual information rendered on that screen. A representation of the content rendered on the screens (which we call "screen content data") may be transmitted from the computerized equipments to handheld device 205 or UPI device 100. In addition, visual descriptions of outlines of screens may be obtained from private or public features database 250. Therefore, visual descriptions of screens may be generated using at least one of the screens content data and the obtained visual descriptions of outlines of screens. The generated visual descriptions of screens may be used for the identification of a particular screen, similar to using stored visual descriptions of objects of interest from public or private features databases for the identification of a particular object of interest, as described in the discussions of FIGS. 3 and 6. A second difference is that the activating of the identified screen by UPI device 100 may be a continuous process of activating and modifying the content displayed on the screen in the same way that common pointing elements are used for activation and control of display screens.

FIG. 9 is a schematic flowchart of a third operation method of UPI device 100 in pointing at display screens, identifying a pointed at screen and activating the identified screen based on the relative position between UPI device 100 and the identified screen and based on user 200 input on UPI device 100. This third operation method is a variant of the first and the second operating methods described in FIGS. 3 and 6, where here the objects of interest are display screens. The identification of a screen may be considered as identifying a particular screen from candidates screens, but it can also be considered as confirming that UPI device 100 is properly positioned and points to a particular screen, ready to activate that screen. Steps 910-940 in FIG. 9 are parallel to steps 310-340 in FIG. 3, where the only difference is that in step 940 the transmitting of the estimated orientation of UPI device 100, the estimated azimuth of UPI device 100 and the generated frontal visual representation for UPI device 100 by communication component 154 from UPI device 100 to handheld device 205 is for the identification of a screen pointed at by UPI device 100. Step 950 describes obtaining features of candidates screens from features database 250, wherein the features of candidates screens comprise of at least one of the location parameters of candidates screens and the visual descriptions of outlines of candidates screens, receiving screen content data of candidates screens from computerized equipments, generating visual descriptions of candidates screens based on at least one of the visual descriptions of outlines of candidates screens and the screen content data of candidates screens, followed by identifying the screen pointed at by UPI device 100 based on the estimated orientation of UPI device 100, on the estimated azimuth of UPI device 100, on the generated frontal visual representation for UPI device 100, on the estimated location parameters of handheld device 205 and on at least one of the obtained location parameters of candidates screens and the generate visual descriptions of candidates screens, as described above in the discussion of FIG. 4. Moreover, as discussed for some objects of interest in FIG. 7, as practically all computerized equipments incorporate wireless communication elements, directional and strength measurements of wireless signals may be used in the identification process.

Once a screen is identified, user 200 may further use UPI device 100 to activate the identified screen. The key to activating the identified screen is the estimation of the screen coordinates at the location pointed at by tip 102 of UPI device 100, which are the coordinates relative to one corner of the screen where the extension of the main axis of UPI device 100 in the frontal direction from tip 102 of UPI device 100, represented by pointing ray 105, meets the identified screen. The estimating of these screen coordinates is similar to the identification of a screen, in the sense that it uses match filtering to establish the exact spatial relations of between UPI device 100 and the identified screen, and is based the estimated orientation of UPI device 100, the estimated azimuth of UPI device 100, the generated frontal visual representation for UPI device 100, the estimated location parameters of handheld device 205 and at least one of the obtained location parameters of the identified screen and the generated visual description of the identified screen (as selected from the candidates screens).

As described above in the discussion of FIG. 4 for the identification of objects of interest, an optional processing step may precede either the matched filtering for the identification of screens or the matched filtering for the estimation of the screen coordinates at the location pointed at by tip 102 of UPI device 100. (The description of the processing step below holds for the estimation of the screen coordinates by substituting "the identified screen" for "candidates screens" and "description" for "descriptions".) The preceding step is the processing of at least one of the visual descriptions of candidates screens and the frontal visual representation for UPI device 100 to generate at least one of a processed version of the visual descriptions of candidates screens and a processed version of the frontal visual representation for UPI device 100, wherein the processing is based on the estimated orientation of UPI device 100, on the estimated azimuth of UPI device 100, on the estimated location parameters of handheld device 205 and on the obtained location parameters of candidates screens, and wherein the identification of the screen (substitute to "the estimation of the screen coordinates at the location pointed at by tip 102 of UPI device 100") is further based on at least one of the processed version of the visual descriptions of candidates screens and the processed version of the frontal visual representation for UPI device 100.

The identified screen may be activated by user 200, such as opening a hyperlink, scrolling, zooming, highlighting or any other activation commonly performed by a mouse or other common pointing element, based on the estimated screen coordinates at the location pointed at by tip 102 of UPI device 100 and based on activating signals from UPI device 100 provided by at least one of accelerometer 122, magnetometer 124, camera 110, gyroscope 126, tactile sensors 132, microphone 134 and fingerprint detection sensor 136, as described in step 960. Obviously, the three methods of generating activation commands based on activating signals, as described above in the discussion of FIG. 6 for the activating of identified objects of interest, can be used for the generating of activation commands for the identified screen.

In additional to 2-dimensional activation based on the screen coordinates at the location pointed at by tip 102 of UPI device 100, which is similar to activation by a mouse or to other common pointing elements, it is also possible to trace the relative 3-dimensional motion between UPI device 100 and the identified screen and to activate the identified screen based on that 3-dimensional motion, such as zooming in and out based on the changing distance between UPI device 100 and the identified screen, which may be detected by any of user input components 130, camera 110 or LIDAR 115.

The interaction of UPI device 100 with the screen of handheld device 830 is of particular interest, as handheld device 830 may not be stationary and therefore the screen coordinates for the screen of handheld device 830 at the location pointed at by tip 102 of UPI device 100 may also depend on the motion of handheld device 830. One aspect is that the relative 3-dimensional motion between UPI device 100 and handheld device 830 may be further tracked by the motion sensors of handheld device 830. Another aspect is that since handheld device 830 includes a front-facing camera and a rear-facing camera, for handheld device 830 the estimation of the screen coordinates at the location pointed at by tip 102 of UPI device 100 and the activation of the screen may also be based on at least one image taken by at least one of the front-facing camera and the rear-facing camera of handheld device 830. When UPI device 100 points to the screen of handheld device 830, image of UPI device 100 may be captured by the front-facing camera, whereas when UPI device 100 points to identified objects of interest in the field of view of the rear-facing camera (depicted by FIG. 10 and discussed below), image of UPI device 100 may be captured by the rear-facing camera. An image of UPI device 100 captured by any of the front-facing camera and the rear-facing camera may be used to further assist in step 960 in the estimation of the screen coordinates for the screen of handheld device 830 at the location pointed at by tip 102 of UPI device 100. An image of UPI device 100 captured by any of the front-facing camera and the rear-facing camera may also be used in the estimation of the relative positions of UPI device 100 and handheld device 830 even if the tip 102 of UPI device 100 is not pointing at the screen of handheld device 830. Moreover, particular shapes and color marking on UPI device 100 may further improve the accuracy and efficiency of the estimation of the relative position between UPI device 100 and handheld device 830, using images captured by any camera on handheld device 830. In addition, measurements by LIDAR 115 of the distance between UPI device 100 and handheld device 830 may be used in tracking the relative position of UPI device 100 with respect to handheld device 830.

Since handheld device 830 includes a rear-facing camera, UPI device 100 may be used to point at objects viewed on the screen of handheld device 830 that are either captured by the rear-facing camera or are virtually generated as augmented reality objects in the environment captured by the rear-facing camera. FIG. 10 shows several examples of UPI device 100 interacting with real and virtual objects that are displayed on the screen of handheld device 830. The first example is of pointing at house in urban environment 540 and at public transportation vehicle 550, which were discussed in FIG. 5. In this first example, the images of these objects of interest are captured by the rear-facing camera and are displayed on the screen of handheld device 830. As user 200 points to these objects of interest, virtual marker 1010 extends pointing ray 105 on the screen of handheld device 830. For the element of house in urban environment 540, UPI device 100 is above the plane of the screen and virtual marker 1010 starts on the screen at the point where pointing ray 105 "reaches" the screen of handheld device 830 and ends near the image of the house in urban environment 540 on the screen. For public transportation vehicle 550, UPI device 100 is below the plane of the screen and therefore its image (part or whole) may be captured by the rear-facing camera of handheld device 830. In this example, virtual marker 1010 starts on the screen at the image of tip 102 of UPI device 100 and ends near the image of public transportation vehicle 550 on the screen. Augmented reality games may place virtual objects 1020 in the environment captured by the rear-facing camera of handheld device 830. As the locations of such objects are determined by the game design and are known, UPI device 100 may be used to point and interact with virtual objects 1020 via the screen of handheld device 830. In particular, special virtual interaction graphics may be used, such as a lightning bolt to fight an evil wizard, a ballistic path to throw a ball to hit a magical creature, or a lasso to catch a flying dragon.

The invention claimed is:

1. A universal pointing and interacting (UPI) device, comprising:
   an elongated body wherein a tip of the UPI device is a frontal end of the longest dimension of the elongated body of the UPI device and a main axis of the UPI device is the axis of longest dimension of the elongated body of the UPI device;
   an accelerometer configured to measure acceleration parameters of the UPI device;
   a magnetometer configured to measure magnetic field parameters of the UPI device;
   a camera positioned at the tip of the UPI device, wherein the camera is configured to capture at least one image of objects of interests from the tip of the UPI device in a frontal direction of the main axis of the UPI device, wherein objects of interest are geographical, topographical, urban or commercial objects in the surroundings of the UPI device such that their features are tabulated in a features database and wherein the features include visual descriptions of the objects of interest;
   a computation component configured to process the measured acceleration parameters to estimate an orientation of the UPI device, the measured magnetic field parameters to estimate an azimuth of the UPI device and the at least one captured image of the objects of interests to generate a frontal visual representation for the UPI device;
   a communication component configured to transmit the estimated orientation of the UPI device, the estimated azimuth of the UPI device and the generated frontal visual representation for the UPI device to a handheld device for the identification of an object of interest, wherein the identification of the object of interest is based on the estimated orientation of the UPI device, on the estimated azimuth of the UPI device, on the generated frontal visual representation for the UPI device, on estimated location parameters of the handheld device, obtained using at least one of GPS signals, WiFi signals, Bluetooth and dedicated wireless beacons signals, and on the features of the objects of interest that include visual descriptions of the objects of interest obtained from the features database;

three output components integrated in the UPI device configured to provide outputs to a user of the UPI device based on the identity of the object of interest, wherein the three output components are an LED, a vibration motor and a loudspeaker.

2. The UPI device of claim 1 further comprising:
at least one component configured to produce activating signals to activate the identified object of interest, wherein the at least one component is at least one of the accelerometer, the magnetometer, the camera, a gyroscope, a tactile sensor, a microphone and a fingerprint detection sensor.

3. The UPI device of claim 2, wherein the computation component is further configured to process the produced activating signals to generate activation commands, and wherein the communication component is further configured to transmit the generated activating commands to the identified object of interest.

4. The UPI device of claim 2, wherein the communication component is further configured to transmit the produced activating signals to the handheld device.

5. The UPI device of claim 2, wherein the computation component is further configured to process the produced activating signals to generate intermediate activation signals and wherein the communication component is further configured to transmit the intermediate activation signals to the handheld device.

6. A method of interacting with an object of interest using a universal pointing and interacting (UPI) device, the method comprises:
measuring acceleration parameters of the UPI device by an accelerometer;
measuring magnetic field parameters of the UPI device by a magnetometer;
capturing at least one image of objects of interests by a camera positioned at a tip of the UPI device facing a frontal direction of a main axis of the UPI device, wherein objects of interest are geographical, topographical, urban or commercial objects in the surroundings of the UPI device such that their features are tabulated in a features database and wherein the features include visual descriptions of the objects of interest and wherein the tip of the UPI device is a frontal end of the longest dimension of an elongated body of the UPI device and the main axis is the axis of the longest dimension of the elongated body of the UPI device;
processing by a computation component the measured acceleration parameters to estimate an orientation of the UPI device, the measured magnetic field parameters to estimate an azimuth of the UPI device and the at least one captured image to generate a frontal visual representation for the UPI device;
transmitting by a communication component the estimated orientation of the UPI device, the estimated azimuth of the UPI device and the generated frontal visual representation for the UPI device from the UPI device to a handheld device;
estimating location parameters of the handheld device using at least one of GPS signals, cellular signals, Wi-Fi signals, Bluetooth signals and dedicated wireless beacons signals;
obtaining the features of candidates objects of interest from the features database;
identifying the object of interest based on the estimated orientation of the UPI device, on the estimated azimuth of the UPI device, on the generated frontal visual representation for the UPI device, on the estimated location parameters of the handheld device, obtained using at least one of GPS signals, WiFi signals, Bluetooth and dedicated wireless beacons signals, and on the obtained features that include visual descriptions of the candidates objects of interest;
providing outputs to a user of the UPI device by three output components of the UPI device based on the identity of the object of interest, wherein the three output components are an LED, a vibration motor and a loudspeaker.

7. The method of claim 6, further comprising:
producing activating signals to activate the identified object of interest by at least one component of the UPI device, wherein the at least one component is at least one of the accelerometer, the magnetometer, the camera, a gyroscope, a tactile sensor, a microphone and a fingerprint detection sensor.

8. The method of claim 7, further comprising:
processing the produced activating signals by the computation component to generate activation commands for the identified object of interest;
transmitting the generated activating commands by the communication component to the identified object of interest.

9. The method of claim 7, further comprising:
transmitting the produced activating signals by the communication component to the handheld device;
processing the activating signals by the handheld device to generate activation commands for the identified object of interest;
transmitting the generated activation commands from the handheld device to the identified object of interest.

10. The method of claim 7, further comprising:
processing the produced activating signals by the computation component to generate intermediate activation signals;
transmitting the generated intermediate activation signals by the communication component to the handheld device;
processing the intermediate activation signals by the handheld device to generate activation commands for the identified object of interest;
transmitting the generated activation commands from the handheld device to the identified object of interest.

11. The method of claim 6, wherein the obtaining of the features of the candidates objects of interest from the features database is based on the estimated azimuth of the UPI device, on the estimated orientation of the UPI device and on the estimated location parameters of the handheld device.

12. The method of claim 6, wherein the obtained features of the candidates objects of interest comprise of location parameters of the candidate objects of interest and visual descriptions of the candidates objects of interest.

13. The method of claim 12, further comprising:
processing at least one of the visual descriptions of candidate objects of interest and the frontal visual representation for the UPI device to generate at least one of a processed version of the visual descriptions of candidates objects of interest and a processed version of the frontal visual representation for the UPI device, wherein the processing is based on the estimated orientation of the UPI device, on the estimated azimuth of the UPI device, on the estimated location parameters of the handheld device and on the obtained location parameters of candidates objects of interest, and wherein the identifying of the object of interest is further based on at least one of the processed version of the visual descriptions of candidate objects of interest and the processed version of the frontal visual representation for the UPI device.

* * * * *